Nov. 1, 1932.                 J. GABLI                 1,885,427
                DRIVING MECHANISM FOR MOTOR VEHICLES
                         Filed Aug. 29, 1930
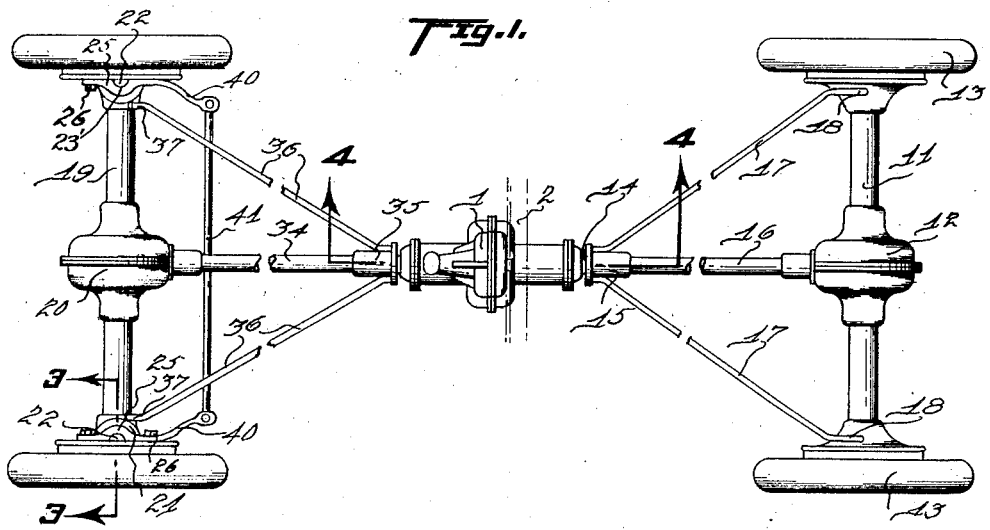
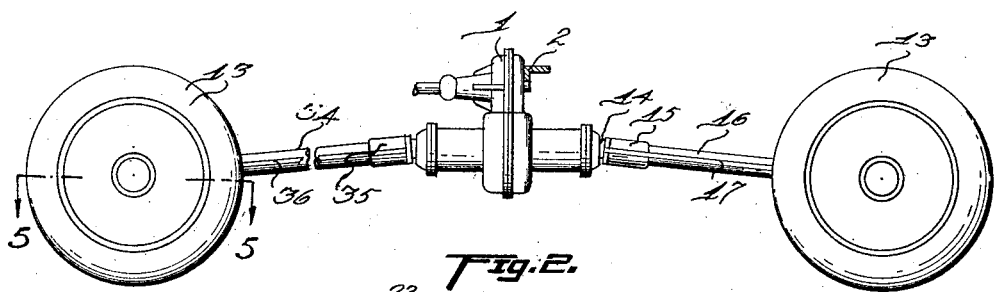
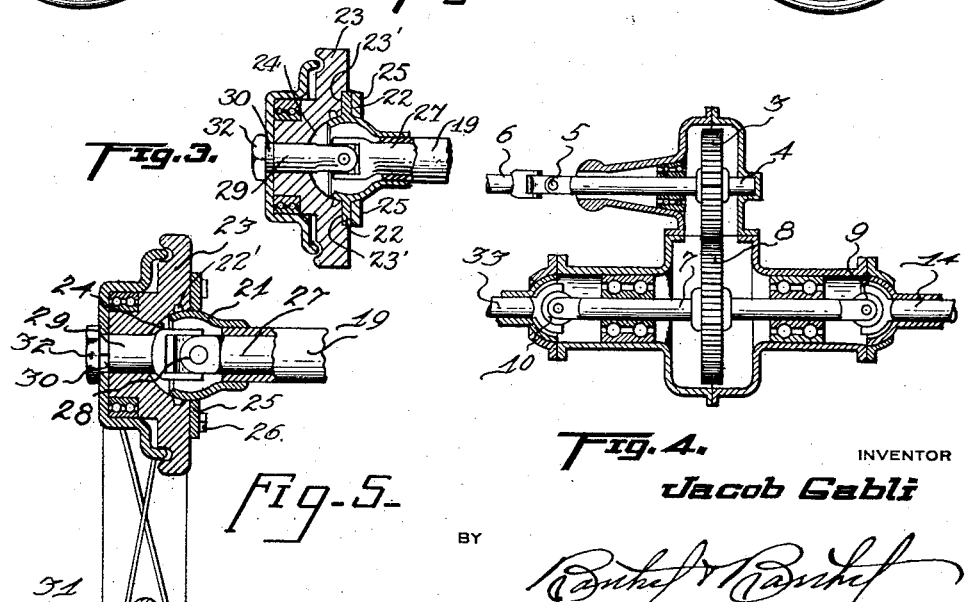
INVENTOR
Jacob Gabli
BY
ATTORNEYS Patented Nov. 1, 1932

1,885,427

UNITED STATES PATENT OFFICE

JACOB GABLI, OF LINCOLN PARK, MICHIGAN

DRIVING MECHANISM FOR MOTOR VEHICLES

Application filed August 29, 1930. Serial No. 479,917.

The present invention pertains to a novel driving mechanism for motor driven vehicles such as automobiles, trucks and tractors or any other vehicle of similar nature.

The primary object of the present invention is to devise a driving mechanism for automobiles and other motor vehicles which comprises a driving connection between the motor and all four wheels whereby all the wheels serve to assist in propelling the vehicle, thereby obtaining an equal distribution of the driving strain and the wear and tear on the tires, thereby increasing the life of the tires and making the vehicle capable of obtaining traction whereby it may pass over muddy or sandy roads which ordinarily cannot be traversed by the conventional rear wheel drive vehicles.

With the above and other ends in view the invention consists in the matters hereinafter set forth and more particularly pointed out in the appended claims, reference being had to the accompanying drawing, in which Figure 1 is a plan view of the present driving mechanism, the chassis, body and motor being removed;

Fig. 2 is a side elevation;

Fig. 3 is a cross sectional view taken on the line 3—3 of Fig. 1,

Fig. 4 is a cross sectional view taken on the line 4—4 of Fig. 1, and, Fig. 5 is a cross sectional view taken along the line 5—5 of Fig. 2.

Like characters of reference are employed throughout to designate the corresponding parts.

The numeral 1 indicates a gear casing which is mounted upon the automobile chassis by a cross rod 2. The upper portion of the casing receives a gear 3 which is mounted upon the shaft 4 having a universal connection 5 to the crank shaft of the vehicle motor, a portion of the crank shaft being shown and designated by the numeral 6. In the lower part of the casing 1 is rotatably mounted a shaft 7 having a gear 8 keyed thereto and meshing with the gear 3, each end of the shaft being provided with universal joints as indicated by numerals 9 and 10.

A conventional rear axle 11 is provided with a differential 12 and wheels 13 and the usual propeller shaft 14 which is connected to the universal joint 9. A bracket 15 is mounted on the propeller shaft casing 16 to support one end of the radius rods 17, the opposite ends of the radius rods being attached to the outer ends of the rear axle casing as at 18.

The front axle casing 19 is also provided with a conventional differential 20, the outer ends of the casing supporting the circular hollow heads 21 which have spindles 22 mounted on the upper and lower sides thereof. Disks 23 are provided with circular recesses 24 having oil groove 22' to receive the heads 21 and with a pair of semi-circular recesses 23' and strap members 25 which are secured by bolts 26 to the disk members having semi-circular recesses that combine with recesses 23' to encircle the spindles 21 in a manner whereby the disks 23 are pivotally mounted on the ends of the axle casings 19. The axle casing receives the front axle 27 which is provided with a universal joint 28 located within the hollow head 21, the axle then projecting through the disk 23 as at 29. The outer end of the axle is keyed as at 30 and the wheel 31 is held on the keyed portion by means of a nut 32.

The differential 20 is connected by a propeller shaft 33, enclosed in the casing 34, to the universal joint 10 on the shaft 7. A bracket 35 is secured to the casing 34 to receive one end of each of the radius rods 36, the opposite ends of the radius rods being secured to the front axle housing as indicated at 36.

In operation the motor which is connected by means of the universal joint 5 to the shaft 4 rotates the latter, the universal joint 5 making it unnecessary that the shaft 6 and 4 should be in perfect alignment. The gear 3 on the shaft 4 meshes with the gear 8 on the shaft 7 and therefore imparts rotation to the latter and it is apparent that the gear ratio could readily be changed to meet varying requirements. Rotation of the shaft 7 causes corresponding rotation of the propeller shaft 14 and the rear wheels 13 and also rotation of the propeller shaft 33 and the front axles 27. Rotation of the front axle is transmitted through the universal joint 28 to the wheels 31 by means of the squared or keyed portion 30.

To pivot the front wheels on the spindles 22 in order that the vehicle may be steered there is provided an extension 40 on the upper strap members 25, the outer ends of these extensions being connected by a cross rod 41 to which any suitable steering wheel mechanism may be applied.

Although a specific embodiment of the present invention has been illustrated and described it is to be understood that various changes may be made in the details of construction without departing from the spirit of the invention as depicted in the following claims, and such changes are contemplated.

What I claim is:

1. A front wheel drive mechanism comprising an axle casing, a circular hollow head mounted on the outer end of said axle casing, a disk having a circular recess in which said circular head is received, diametrically opposite spindles on said head and projecting into semi-circular recesses in the face of said disk surrounding said opening therein, strap members secured to said disk and having semi-circular recesses co-inciding with the recesses in said disk to form bearings for said spindles, an axle in said casing, a universal joint on said axle and received in said hollow head, a wheel rotatably mounted on said disk, and means for connecting said universal joint to said wheel.

2. A front wheel drive mechanism comprising an axle casing, a circular hollow head mounted on the outer end of said axle casing, a disk having a circular recess in which said circular head is received, diametrically opposite spindles on said head and projecting into semi-circular recesses in the face of said disk surrounding said opening therein, strap members secured to said disk and having semi-circular recesses co-inciding with the recesses in said disk to form bearings for said spindles, an extension formed integral with one of said straps and adapted to be connected to a steering apparatus, an axle in said casing, a universal joint on said axle and received in said hollow head, a wheel rotatably mounted on said disk, and means for connecting said universal joint to said wheel.

In testimony whereof I affix my signature.

JACOB GABLI.